(12) United States Patent
Vranish

(10) Patent No.: US 12,442,477 B2
(45) Date of Patent: *Oct. 14, 2025

(54) LOW-SPILL COUPLING ASSEMBLY

(71) Applicant: Colder Products Company, Roseville, MN (US)

(72) Inventor: David J. Vranish, Mound, MN (US)

(73) Assignee: Colder Products Company, Roseville, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/233,499

(22) Filed: Jun. 10, 2025

(65) Prior Publication Data

US 2025/0297699 A1 Sep. 25, 2025

Related U.S. Application Data

(63) Continuation of application No. 18/532,514, filed on Dec. 7, 2023, now Pat. No. 12,359,759, which is a continuation of application No. 17/362,288, filed on Jun. 29, 2021, now Pat. No. 11,885,451, which is a continuation of application No. 16/670,294, filed on Oct. 31, 2019, now Pat. No. 11,079,052, which is a continuation of application No. 16/668,537, filed on Oct. 30, 2019, now Pat. No. 11,060,650, which is a continuation of application No. 14/567,254, filed on Dec. 11, 2014, now Pat. No. 11,067,210, which is a continuation-in-part of application No. 14/212,322, filed on Mar. 14, 2014, now abandoned.

(Continued)

(51) Int. Cl.
*F16L 37/413* (2006.01)
*F16L 27/073* (2006.01)
*F16L 37/086* (2006.01)
*F16L 37/34* (2006.01)
*F16L 37/35* (2006.01)

(52) U.S. Cl.
CPC .......... *F16L 37/413* (2013.01); *F16L 27/073* (2013.01); *F16L 37/086* (2013.01); *F16L 37/34* (2013.01); *F16L 37/35* (2013.01); *Y10T 137/87957* (2015.04)

(58) Field of Classification Search
CPC ......... F16L 37/413; F16L 37/36; F16L 37/34; F16L 37/32; F16L 37/30; F16L 37/0841; F16L 37/35; F16L 37/086; F16L 27/073; F16L 29/04; Y10T 137/87949; Y10T 137/87957; Y10T 137/87965; Y10T 137/87941

See application file for complete search history.

(56) References Cited

U.S. PATENT DOCUMENTS 2,854,259 A 9/1958 Clark
3,334,659 A 8/1967 Magorien
(Continued)

OTHER PUBLICATIONS

International Search Report and Written Opinion for PCT/US2014/027937 mailed Jul. 8, 2014.
(Continued)

*Primary Examiner* — Craig M Schneider
*Assistant Examiner* — Andrew J Rost
(74) *Attorney, Agent, or Firm* — Fish & Richardson P.C.

(57) ABSTRACT

The present disclosure relates to a low-spill coupling assembly including a female coupling device and a male coupling device.

25 Claims, 17 Drawing Sheets

Related U.S. Application Data

(60) Provisional application No. 61/799,612, filed on Mar. 15, 2013.

(56) References Cited

U.S. PATENT DOCUMENTS

| | | | |
|---|---|---|---|
| 4,079,966 A | 3/1978 | Berry et al. |
| 4,327,770 A | 5/1982 | Brown et al. |
| 4,340,052 A | 7/1982 | Dennehey et al. |
| 4,447,040 A | 5/1984 | Magorian |
| 4,541,457 A | 9/1985 | Blenkush |
| D298,605 S | 11/1988 | Colgan et al. |
| 4,875,711 A | 10/1989 | Watanabe |
| 4,892,117 A | 1/1990 | Spalink |
| 4,919,457 A | 4/1990 | Moretti |
| 4,936,345 A | 6/1990 | Nix |
| D309,774 S | 8/1990 | Lewis |
| D313,067 S | 12/1990 | Kotake et al. |
| 4,991,627 A | 2/1991 | Nix |
| 5,018,352 A | 5/1991 | Compton |
| 5,104,158 A | 4/1992 | Meyer et al. |
| 5,113,657 A | 5/1992 | Compton et al. |
| 5,139,049 A | 8/1992 | Jensen et al. |
| 5,215,122 A | 6/1993 | Rogers et al. |
| 5,292,157 A | 3/1994 | Rubichon |
| 5,316,041 A | 5/1994 | Ramacier, Jr. et al. |
| 5,339,862 A | 8/1994 | Haunhorst |
| 5,482,083 A | 1/1996 | Jenski |
| 5,494,073 A | 2/1996 | Saito |
| 5,494,074 A | 2/1996 | Ramacier et al. |
| 5,546,985 A | 8/1996 | Bartholomew |
| 5,703,243 A | 12/1997 | Nishitani et al. |
| 5,709,243 A | 1/1998 | Wells et al. |
| D396,730 S | 8/1998 | Schaupp |
| 5,911,403 A | 6/1999 | deCler et al. |
| 5,938,244 A | 8/1999 | Meyer |
| 5,975,489 A | 11/1999 | deCler et al. |
| D419,860 S | 2/2000 | Persson |
| 6,024,124 A | 2/2000 | Braun et al. |
| 6,082,399 A | 7/2000 | Nyberg |
| 6,082,401 A | 7/2000 | Braun et al. |
| 6,095,190 A | 8/2000 | Wilcox et al. |
| 6,116,277 A | 9/2000 | Wilcox et al. |
| 6,176,263 B1 | 1/2001 | Lacroix et al. |
| 6,283,151 B1 | 9/2001 | Countryman et al. |
| 6,328,348 B1 | 12/2001 | Cornford et al. |
| 6,386,596 B1 | 5/2002 | Olson |
| D468,016 S | 12/2002 | Mosler et al. |
| 6,517,121 B1 | 2/2003 | Cresswell |
| 6,681,803 B2 | 1/2004 | Taneya et al. |
| 6,685,230 B1 | 2/2004 | Bottura |
| D494,256 S | 8/2004 | Nortier |
| 6,802,399 B2 | 10/2004 | Niebling et al. |
| 7,044,161 B2 | 5/2006 | Tiberghien |
| 7,063,357 B1 | 6/2006 | Bay |
| 7,185,674 B2 | 3/2007 | Taylor |
| 7,213,845 B2 | 5/2007 | Sato |
| 7,434,842 B2 | 10/2008 | Schmidt |
| 7,469,472 B2 | 12/2008 | deCler et al. |
| 7,547,047 B2 | 6/2009 | deCler et al. |
| 7,568,737 B2 | 8/2009 | Wells et al. |
| D608,424 S | 1/2010 | Katsuta et al. |
| D610,760 S | 2/2010 | Zugen et al. |
| 7,708,029 B2 | 5/2010 | Kitagawa et al. |
| 7,980,599 B2 | 7/2011 | Schindel |
| D648,008 S | 11/2011 | Percoco et al. |
| D654,573 S | 2/2012 | Lombardi et al. |
| 8,201,853 B2 | 6/2012 | Tiberghien et al. |
| D679,784 S | 4/2013 | Meyer |
| D687,528 S | 8/2013 | Meyer |
| 8,590,860 B2 | 11/2013 | Kitagawa |
| 8,764,068 B2 | 7/2014 | Frick et al. |
| 8,870,235 B2 | 10/2014 | Turk |
| 8,910,980 B2 | 12/2014 | Neal et al. |
| 9,157,560 B2 | 10/2015 | Rehder et al. |
| D752,721 S | 3/2016 | Wildfang et al. |
| D758,555 S | 6/2016 | Van Dyke et al. |
| D761,395 S | 7/2016 | Plackner et al. |
| D788,890 S | 6/2017 | Downs et al. |
| 9,689,516 B2 | 6/2017 | Frick et al. |
| D816,211 S | 4/2018 | Guala |
| D830,523 S | 10/2018 | Vranish |
| D830,524 S | 10/2018 | Vranish |
| D838,350 S | 1/2019 | Downs et al. |
| D879,250 S | 3/2020 | Vranish |
| D898,878 S | 10/2020 | Sprenger |
| D953,495 S | 5/2022 | Banks |
| D1,016,251 S | 2/2024 | Castriotta |
| D1,020,986 S | 4/2024 | Del Piero |
| D1,043,924 S | 9/2024 | Sprenger |
| 12,129,952 B1 * | 10/2024 | Vranish .................. F16L 37/34 |
| 12,359,759 B2 * | 7/2025 | Vranish ................ F16L 27/073 |
| 2005/0001425 A1 | 1/2005 | deClear et al. |
| 2007/0029796 A1 | 2/2007 | Bibby |
| 2007/0035129 A1 | 2/2007 | Chappaz |
| 2007/0120361 A1 | 5/2007 | Kao |
| 2009/0167018 A1 | 7/2009 | Lien |
| 2010/0019487 A1 | 1/2010 | deCler et al. |
| 2010/0051129 A1 | 3/2010 | Kitagawa |
| 2011/0067225 A1 | 3/2011 | Bassaco |
| 2013/0092271 A1 | 4/2013 | Downs et al. |
| 2014/0060675 A1 | 3/2014 | Wilhelm et al. |
| 2014/0261819 A1 | 9/2014 | Vranish |
| 2015/0090915 A1 | 4/2015 | Vranish |
| 2015/0267851 A1 | 9/2015 | Aoki |
| 2025/0065668 A1 | 2/2025 | Raves |

OTHER PUBLICATIONS

International Preliminary Report on Patentability in Application No. PCT/US2014/027397, dated Sep. 15, 2015, 6 pages.

* cited by examiner

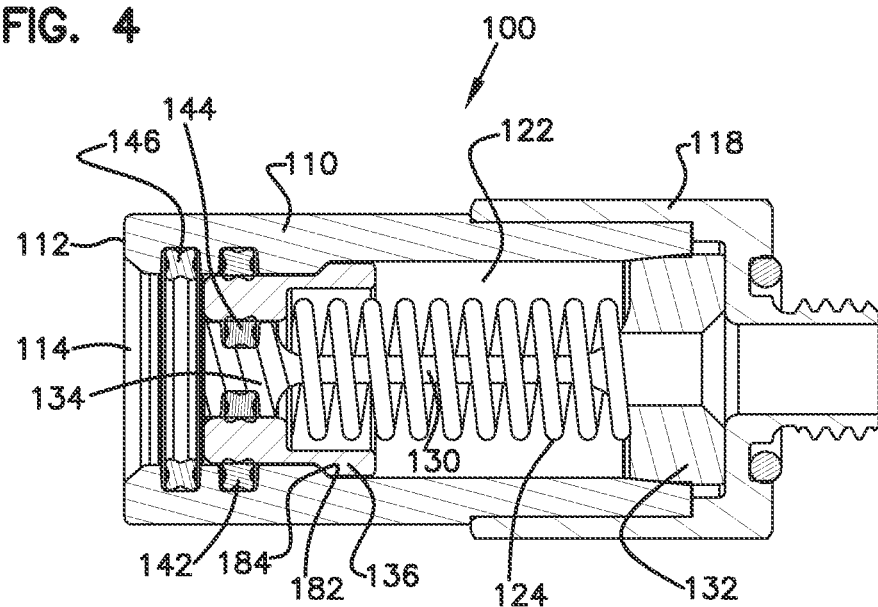
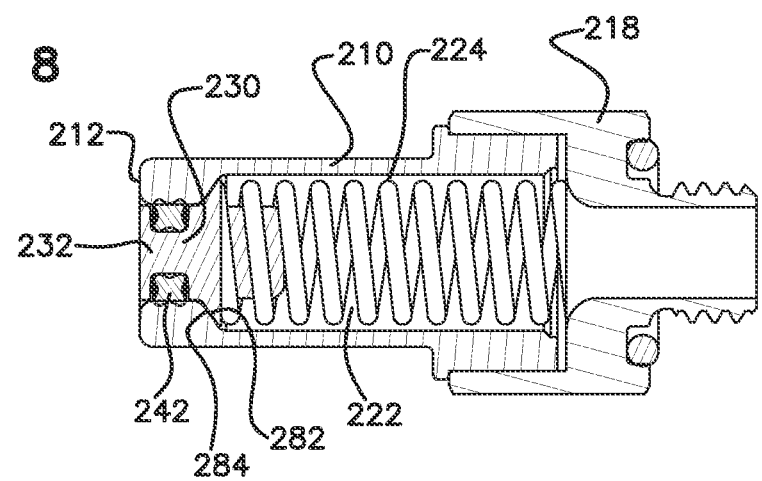

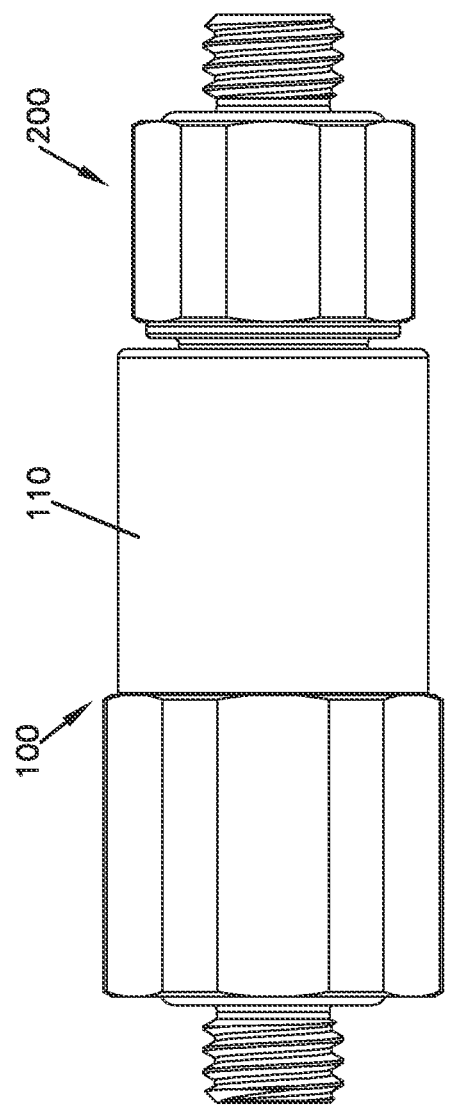
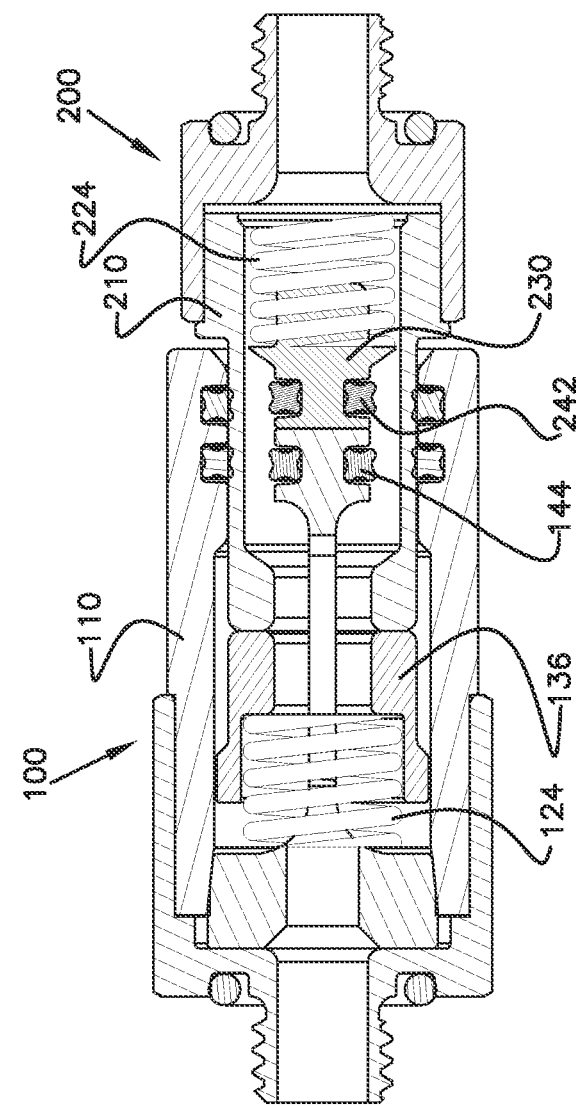
FIG. 13
FIG. 14

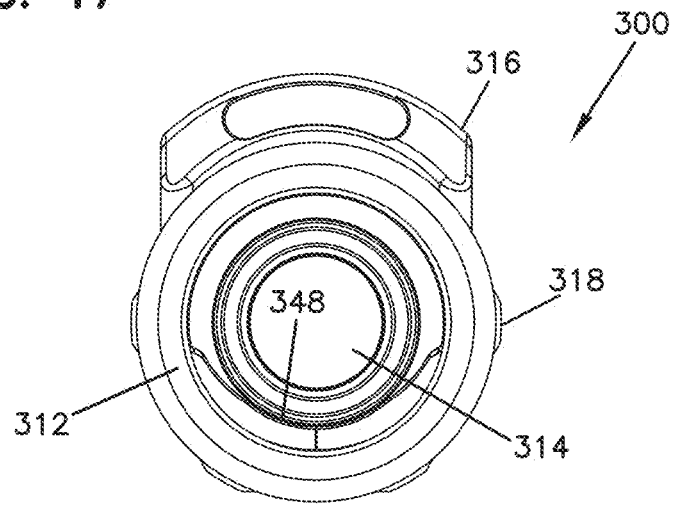
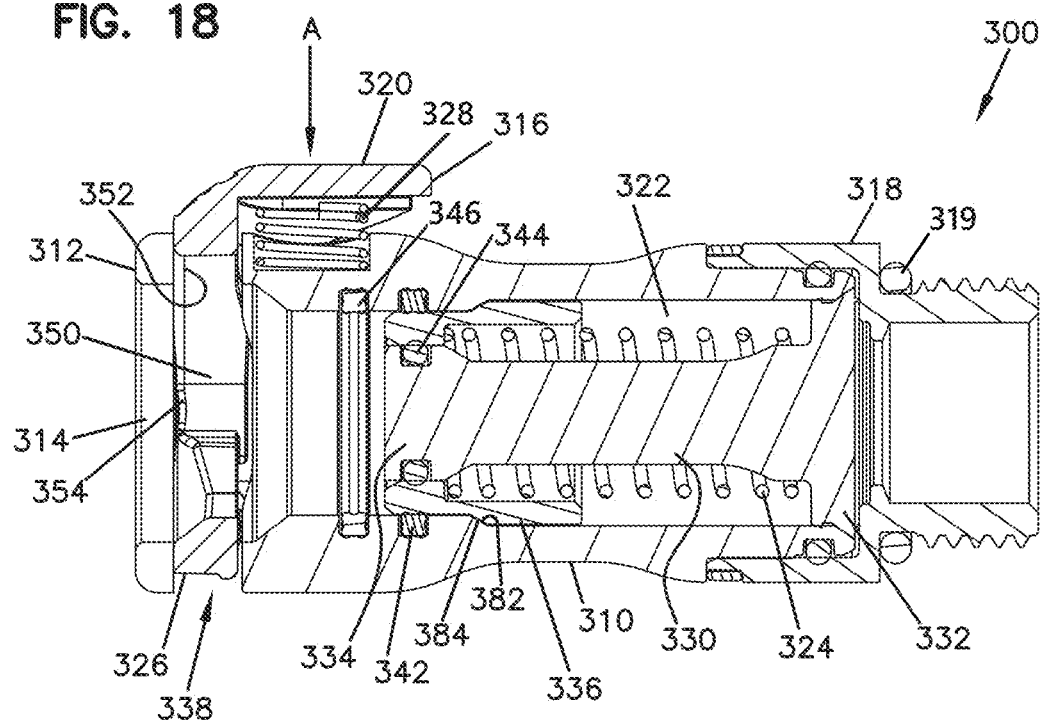

LOW-SPILL COUPLING ASSEMBLY

CROSS-REFERENCE TO RELATED APPLICATIONS

This is a continuation of and claims priority to U.S. patent application Ser. No. 18/532,514 filed on Dec. 7, 2023 (now U.S. Pat. No. 12,359,759), which is a continuation of and claims priority to U.S. patent application Ser. No. 17/362,288 filed on Jun. 29, 2021 (now U.S. Pat. No. 11,885,451), which is a continuation of and claims priority to U.S. patent application Ser. No. 16/670,294 filed on Oct. 31, 2019 (now U.S. Pat. No. 11,079,052), which is a continuation of and claims priority to U.S. patent application Ser. No. 16/668,537 filed on Oct. 30, 2019 (now U.S. Pat. No. 11,060,650), which is a continuation of and claims priority to U.S. patent application Ser. No. 14/567,254 filed on Dec. 11, 2014 (now U.S. Pat. No. 11,067,210), which is a continuation-in-part of U.S. patent application Ser. No. 14/212,322 filed on Mar. 14, 2014, which is a nonprovisional of and claims priority to U.S. Patent Application No. 61/799,612 filed on Mar. 15, 2013, the disclosures of all of which are expressly incorporated herein by reference in their entirety.

BACKGROUND

Coupling assemblies typically include female and male couplings that are connected to create a fluid flow path therebetween. Such coupling assemblies can be used in various applications, including biomedical applications, beverage dispensing, instrument connections, photochemical handling, liquid cooling of electronics, ink handling, and others.

SUMMARY

In one aspect, a coupling system includes: a female coupling device, the female coupling device including a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; and a third seal that is positioned at the opening of the main body. The coupling system includes: a male coupling device, the male coupling device including a second main body with a second front face, the second front face defining a second opening leading into a second fluid passageway; a valve member and a second spring positioned within the second fluid passageway; and a major seal that seals between the second main body and the valve member. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

In another aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; and a third seal that is positioned at the opening of the main body to seal against a mating male coupling device. The male coupling device is capable of being inserted into the opening of the main body of the female coupling device.

In a further aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; a third seal that is positioned at the opening of the main body to seal against a mating male coupling device; and a clip member slidably mounted on the female coupling device, the clip member slidable between a connecting position wherein the clip member engages the mating male coupling device and a disconnecting position wherein the clip member is disengaged from the mating male coupling device.

A further aspect still relates to a coupling system including: a female coupling device, the female coupling device including: a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; a third seal that is positioned at the opening of the main body; and a clip member slidably mounted on the female coupling device. The coupling system includes a male coupling device, the male coupling device including: a second main body with a second front face, the second front face defining a second opening leading into a second fluid passageway; a valve member and a second spring positioned within the second fluid passageway; and a major seal that seals between the second main body and the valve member. The clip member is slidable between a connecting position where the clip member engages the male coupling device and a disconnecting position where the clip member is disengaged from the male coupling device. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

DESCRIPTION OF THE DRAWINGS

Reference is now made to the accompanying drawings, which are not necessarily drawn to scale.

FIG. 4 is a cross-sectional view of the female coupling device of FIG. 1.

FIG. 8 is a cross-sectional view of the male coupling device of FIG. 5.

FIG. 13 is a side view of the female and male coupling devices in a fully-coupled position.

FIG. 14 is a cross-sectional view of the female and male coupling devices of FIG. 13.

FIG. 17 is an end view of the female coupling device of FIG. 15.

FIG. 18 is a cross-sectional view of the female coupling device of FIG. 15.

DETAILED DESCRIPTION

Figure 1:
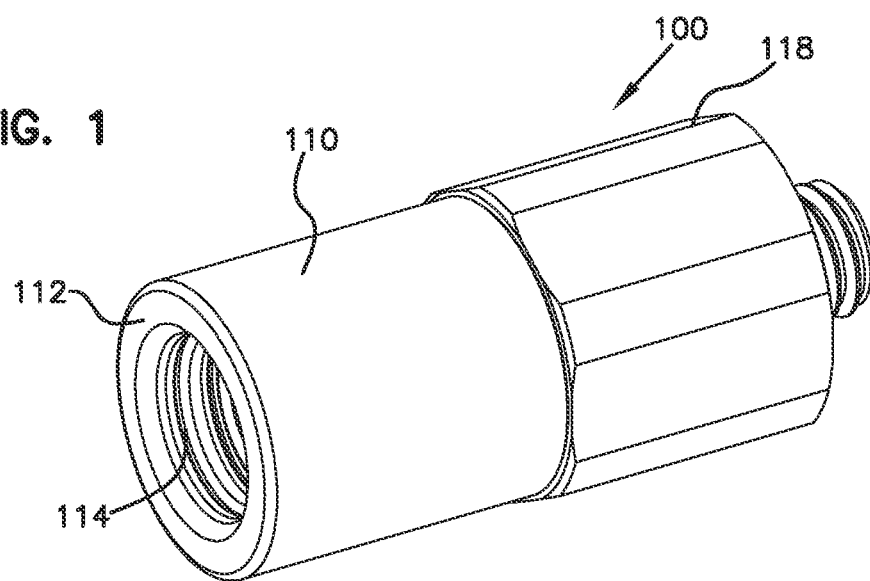
FIG. 1 is a perspective of an example female coupling device.
Figure 2:
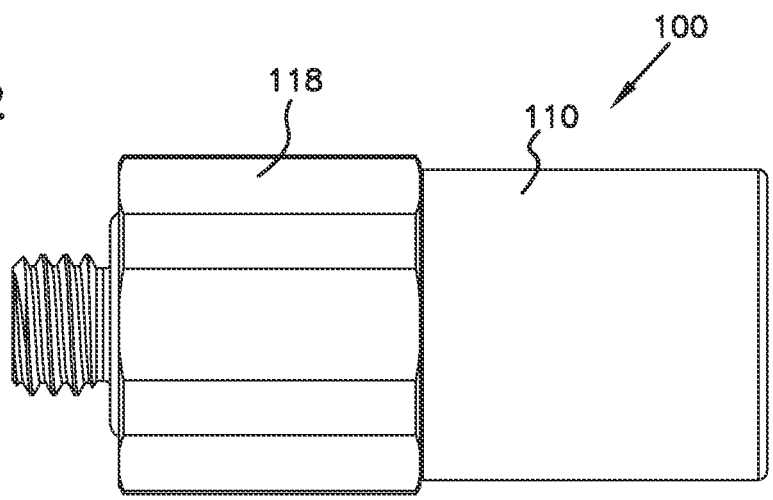
FIG. 2 is a side view of the female coupling device of FIG. 1.
Figure 3:
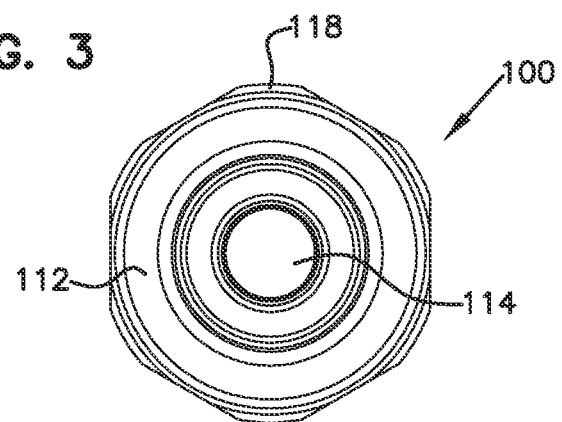
FIG. 3 is an end view of the female coupling device of FIG. 1.
Figure 5:
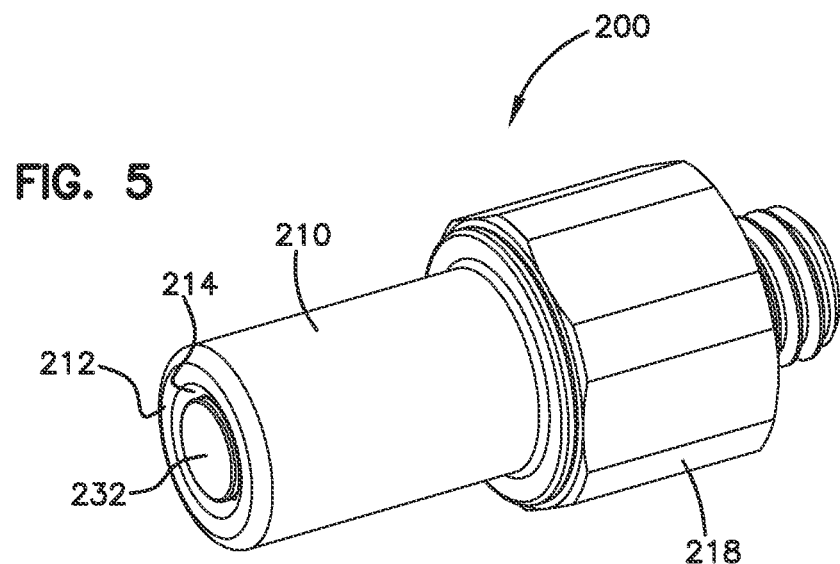
FIG. 5 is a perspective of an example male coupling device.
Figure 6:
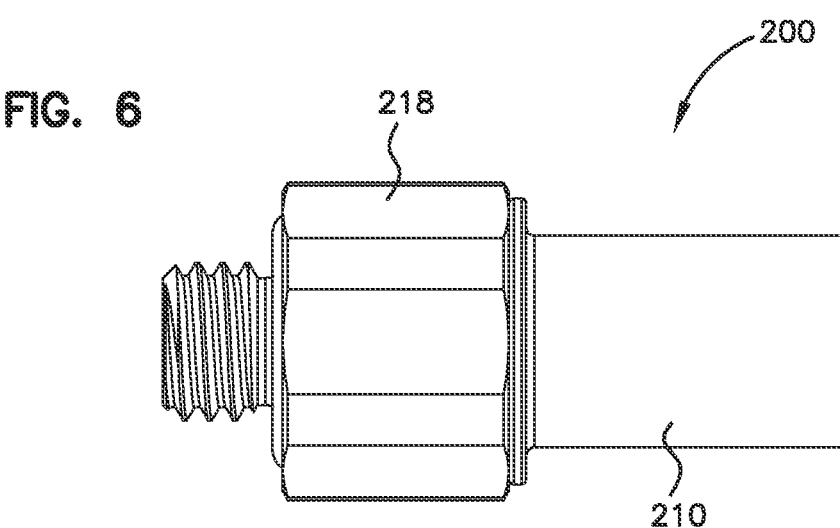
FIG. 6 is a side view of the male coupling device of FIG. 5.
Figure 7:
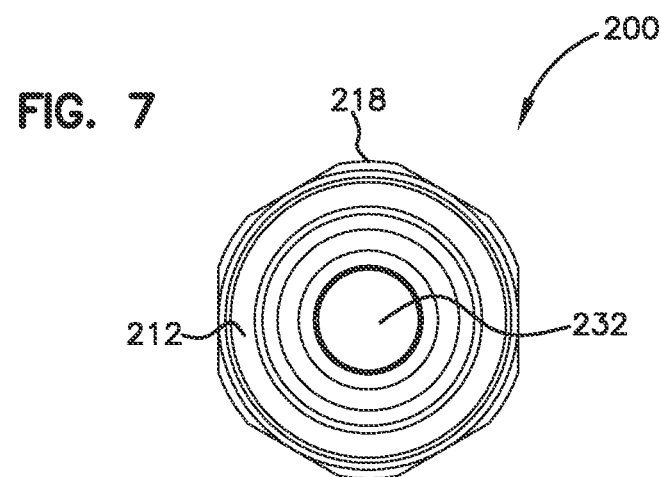
FIG. 7 is an end view of the male coupling device of FIG. 5.

The present disclosure relates to a low-spill coupling assembly including a female coupling device and a male coupling device. Additional details are provided below.

Referring now to FIGS. 1-4, an example female coupling device 100 is shown.

The female coupling device 100 includes a main body 110 having a front face 112. The front face 112 defines an opening 114 leading into a fluid passageway 122.

The female coupling device 100 also includes a termination 118 coupled to the main body 110 using known techniques, such as sonic welding, staking, press-fitting, and threading. The termination 118 is configured to be coupled to another component, such as a fluid line or device.

The example female coupling device 100 includes a stem 130, sleeve 136, and spring 124 positioned within the fluid passageway 122.

The stem 130 includes a base end 132 positioned against the termination 118. The stem 130 also includes a stem head 134 positioned within the sleeve 136. The spring 124 is positioned about the stem 130 and biases the sleeve 136 into the closed position shown in FIG. 4. In this position, a shoulder 182 on the sleeve 136 engages a surface 184 formed by the main body 110 to limit further travel of the sleeve 136 in a direction toward the front face 112.

In this position, a first seal 142 provides a seal between the main body 110 and the sleeve 136. In addition, a second seal 144 provides a seal between the sleeve 136 and the stem head 134. These seals limit movement of fluid through the fluid passageway 122.

A further third seal 146 is positioned at the opening 114 of the main body 110 to seal against a mating male coupling device 200, described below.

Referring now to FIGS. 5-8, the male coupling device 200 is shown.

The male coupling device 200 includes a main body 210 having a front face 212. The front face 212 defines an opening 214 leading into a fluid passageway 222.

The male coupling device 200 also includes a termination 218 coupled to the main body 210 using known techniques, such as sonic welding or staking. The termination 218 is configured to be coupled to another component, such as a fluid line.

The example male coupling device 200 includes a valve member 230 and spring 224 positioned within the fluid passageway 222. The spring 224 is biases the valve member 230 into the closed position shown in FIG. 8. A front surface 232 of the valve member 230 is exposed at the front face 212 of the main body 210. In this position, a shoulder 282 on the valve member 230 engages a surface 284 formed by the main body 210 to limit further travel of the valve member 230 in a direction toward the front face 212.

In this position, a first seal 242 provides a seal between the main body 210 and the valve member 230. The seal limits movement of fluid through the fluid passageway 222.

Figure 9:
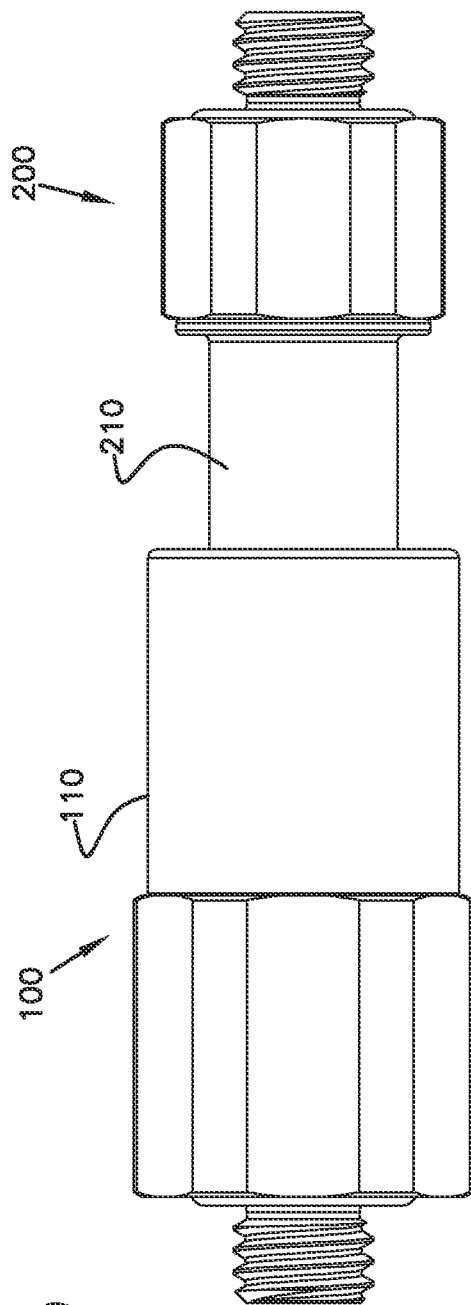
FIG. 9 is a side view of a coupling assembly including the female and male coupling devices in a pre-coupled position.
Figure 10:
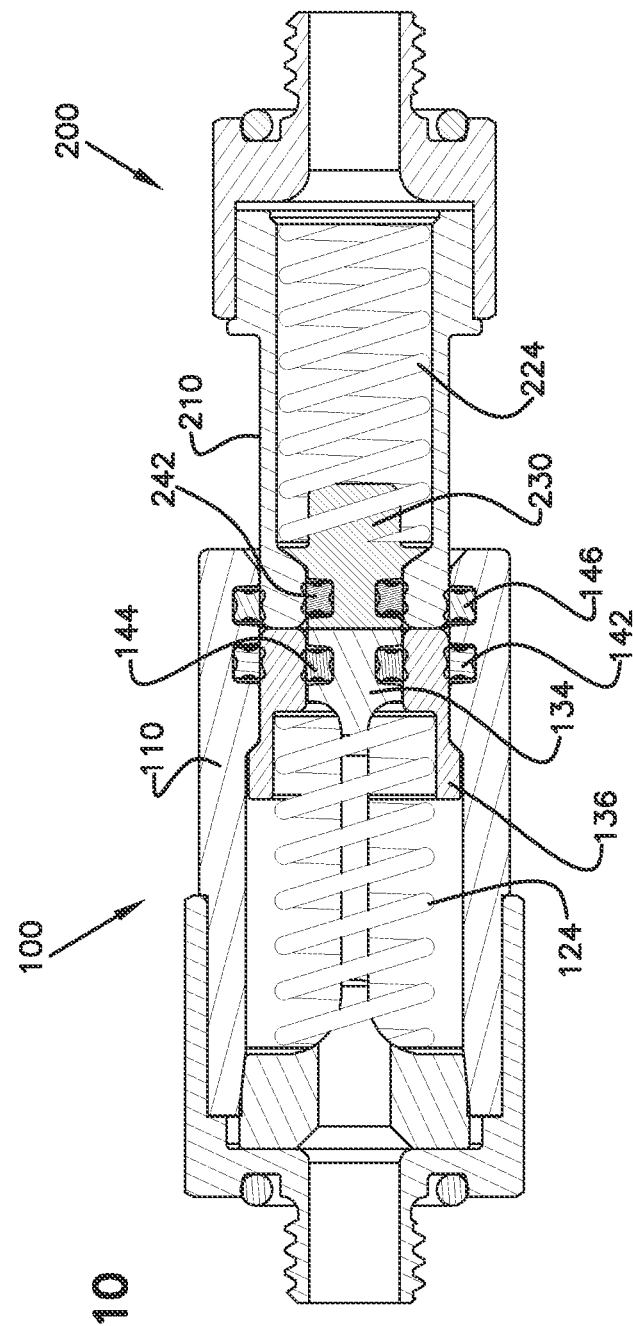
FIG. 10 is a cross-sectional view of the female and male coupling devices of FIG. 9.

Referring now to FIGS. 9-10, the female coupling device 100 and the male coupling device 200 are shown in a pre-coupled position. In this position, the main body 210 of the male coupling device 200 is partially inserted into the opening 114 of the main body 110 of the female coupling device 100.

In this position, the front surface 232 of the valve member 230 engages the stem head 134. In addition, the front face 212 engages the sleeve 136. Further, the third seal 146 seals against the main body 210 of the male coupling device 200 so that a fluid-tight configuration is created.

Figure 11:
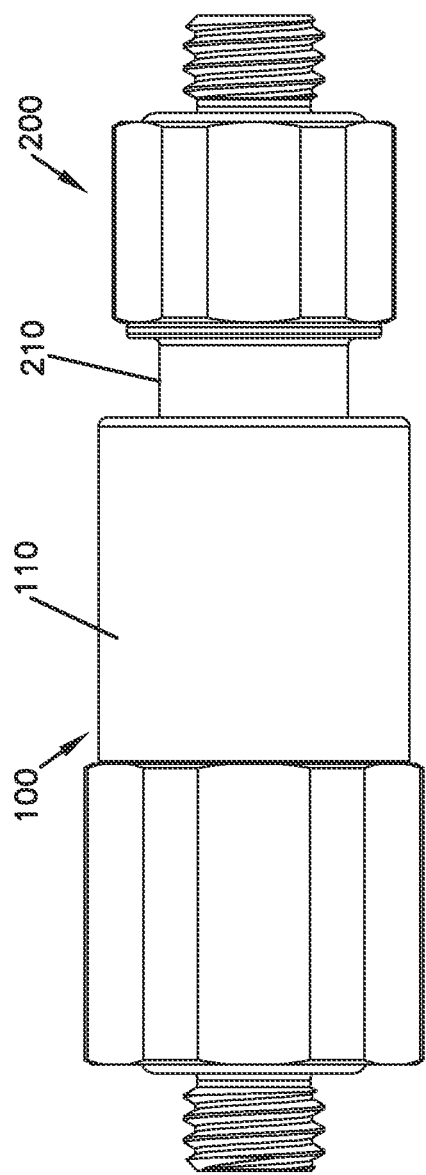
FIG. 11 is a side view of the female and male coupling devices in a partially-coupled position.
Figure 12:
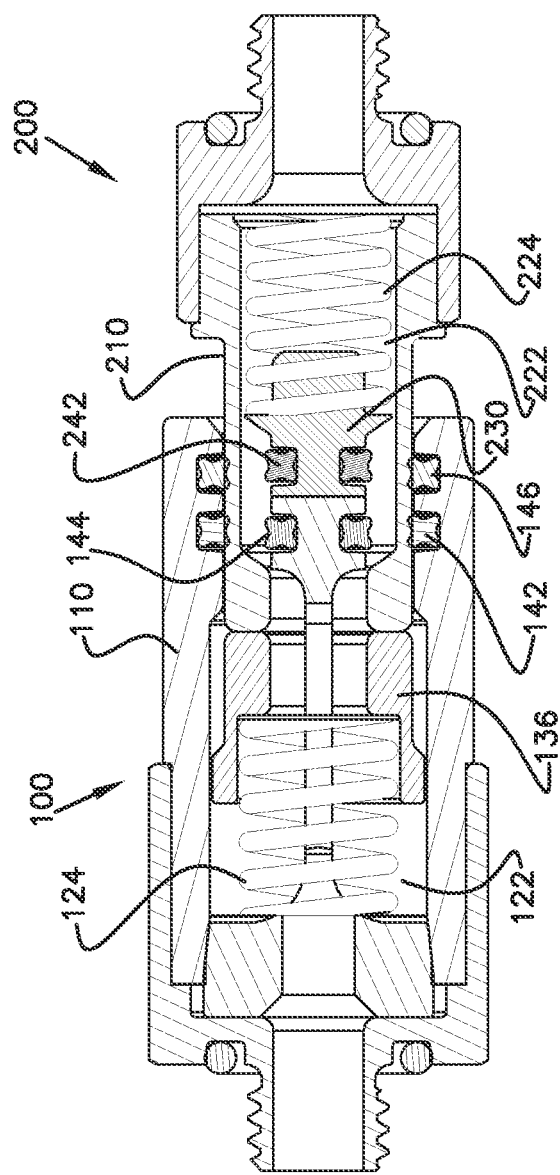
FIG. 12 is a cross-sectional view of the female and male coupling devices of FIG. 11.

Referring now to FIGS. 11-12, the female coupling device 100 and the male coupling device 200 are shown in a partially-coupled position. In this position, the main body 210 of the male coupling device 200 is more-completely inserted into the opening 114 of the main body 110 of the female coupling device 100.

As this occurs, the main body 210 of the male coupling device 200 is positioned in the fluid passageway 122 so that both seals 142, 146 engage the main body 210. Further, both the sleeve 136 and the valve member 230 are displaced against the springs 124, 224, respectively. When this occurs, the seals 144, 242 are disengaged so that fluid can start to flow through the fluid passageways 122, 222.

Referring now to FIGS. 13-14, the female coupling device 100 and the male coupling device 200 are shown in a fully-coupled position. In this position, the main body 210 of the male coupling device 200 is completely inserted into the opening 114 of the main body 110 of the female coupling device 100.

Both of the springs 124, 224 are compressed, and the sleeve 136 and valve member 230 are further displaced. This assures that seals 144, 242 are fully disengaged so that fluid can pass through the fluid passageways 122, 222.

To release, the male coupling device 200 is pulled out of the female coupling device 100. When this occurs, the springs 124, 224 return the sleeve 136 and the valve member 230 to the resting positions shown in FIGS. 9-10.

Referring now to FIGS. 15-18, another example female coupling device 300 is shown.

The female coupling device 300 includes a main body 310 having a front face 312. The front face 312 defines an opening 314 leading into a fluid passageway 322 (see FIG. 18).

The female coupling device 300 also includes a termination 318 coupled to the main body 310 using known techniques, such as sonic welding, staking, press-fitting, and threading. The termination 318 is configured to be coupled to another component, such as a fluid line or device. The female coupling device 300 includes a locking collar, herein referred to as a quick connecting/disconnecting clip member 316, which is used to quickly disconnect and connect the female coupling device 300 with another component.

The example female coupling device 300 includes a stem 330, sleeve 336, and spring 324 positioned within the fluid passageway 322. The stem 330 includes a base end 332 positioned against the termination 318. The stem 330 also includes a stem head 334 positioned within the sleeve 336. The spring 324 is positioned about the stem 330 and biases the sleeve 336 into the closed position shown in FIG. 18. In this position, a shoulder 382 on the sleeve 336 engages a surface 384 formed by the main body 310 to limit further travel of the sleeve 336 in a direction toward the front face 312. In this position, a first seal 342 provides a seal between the main body 310 and the sleeve 336. In addition, a second seal 344 provides a seal between the sleeve 336 and the stem head 334. These seals limit movement of fluid through the fluid passageway 322. A further third seal 346 is positioned at the opening 314 of the main body 310 to seal against a mating male coupling device 400, as described below.

Figure 15:
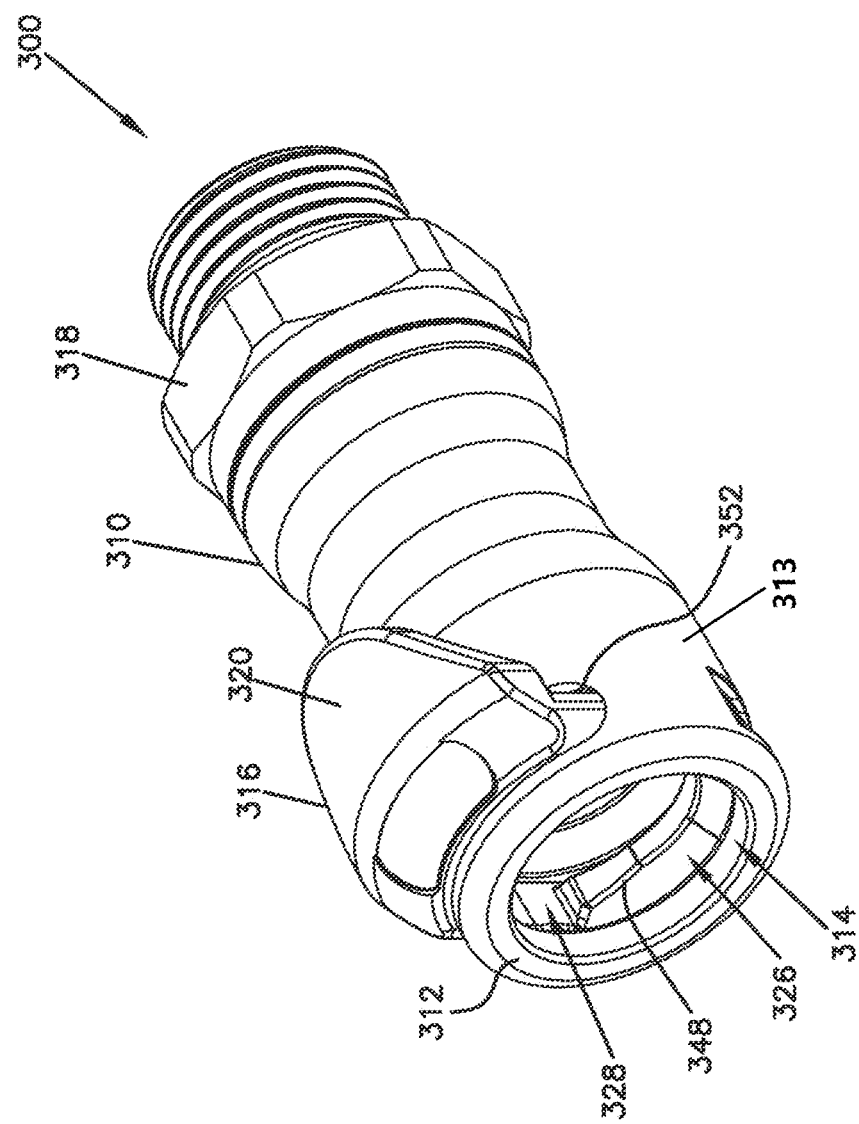
FIG. 15 is a perspective view of another example female coupling device.
Figure 16:
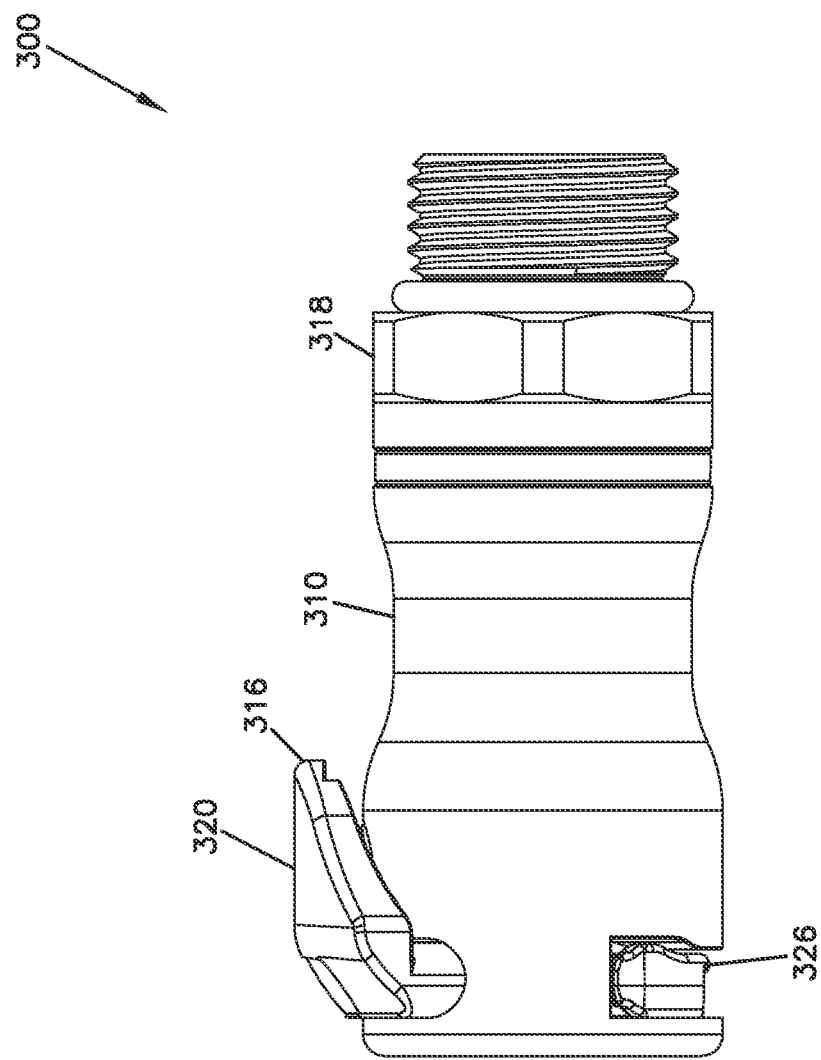
FIG. 16 is a side view of the female coupling device of FIG. 15.
Figure 19:
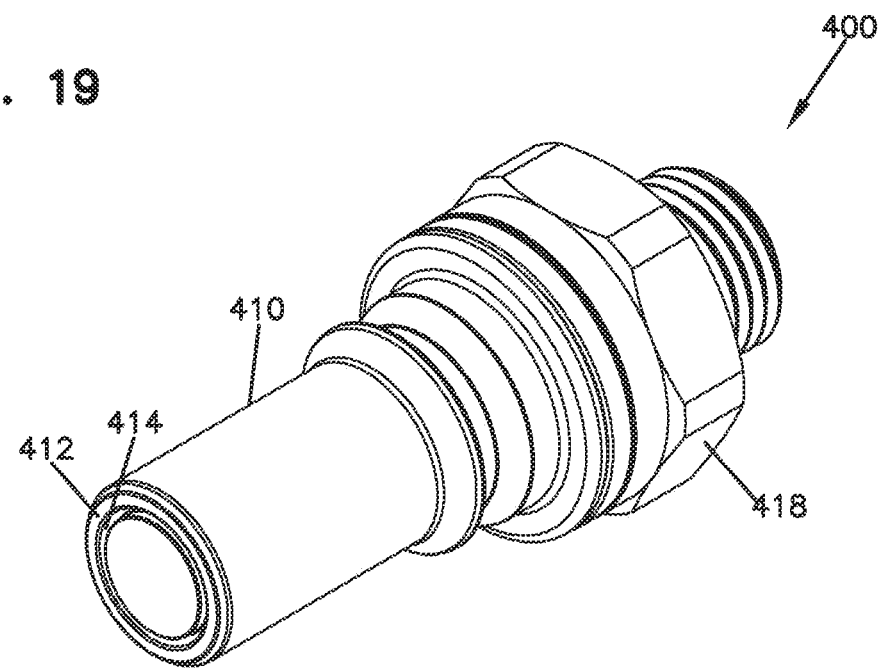
FIG. 19 is a perspective view of another example male coupling device.
Figure 20:
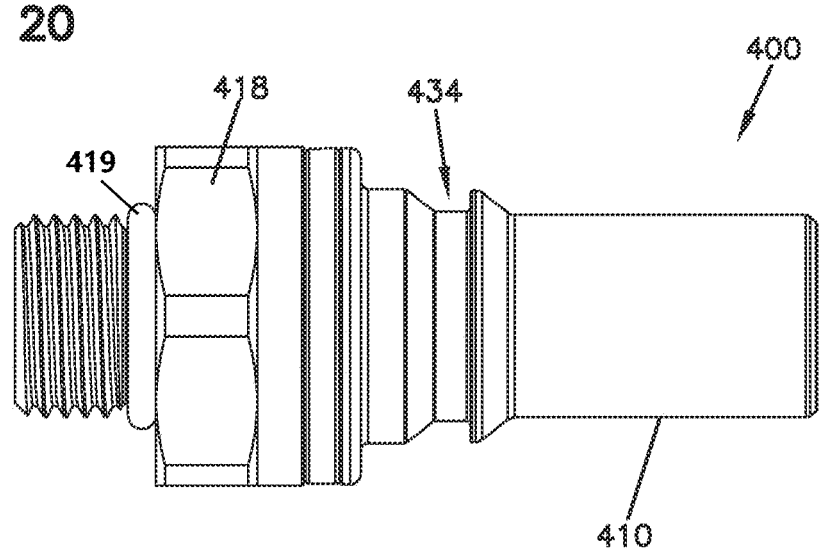
FIG. 20 is a side view of the male coupling device of FIG. 19.
Figure 21:
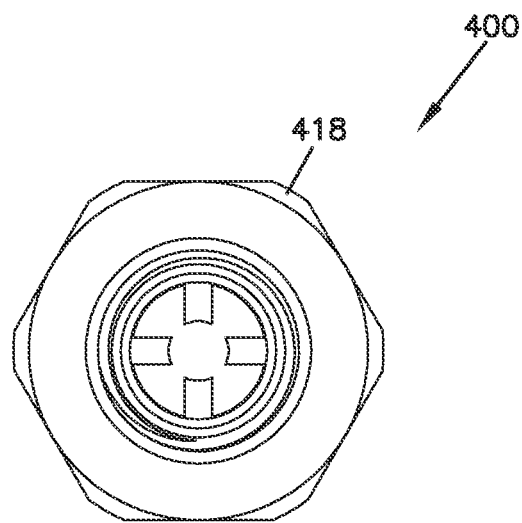
FIG. 21 is an end view of the male coupling device of FIG. 19.
Figure 22:
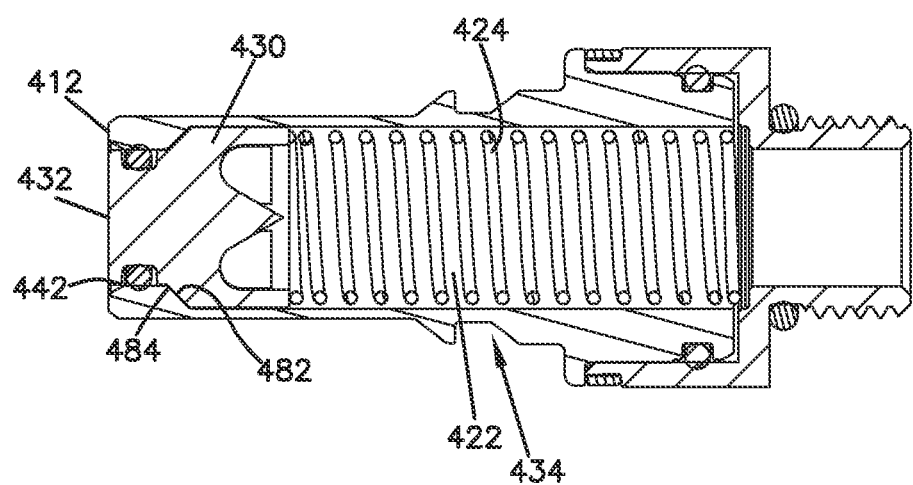
FIG. 22 is a cross-sectional view of the male coupling device of FIG. 19.

In the depicted example, the clip member 316 includes a tab portion 320 and a plate portion 326 interconnected to each other at roughly a right angle in a generally L-shaped configuration. In FIG. 15, the clip member 316 is in a resting or locking position. The clip member 316 can be biased or forced into the locked position using an integral cantilever or spring 328 (see FIG. 18). The clip member 316 is moved in a direction A within an opening 338 of the main body 310 to an unlocked position. The clip member 316 can be moved to this position to, for example, connect or release another component, such as, an insert.

The tab portion 320 of the clip member 316 provides a surface for the user to press down on the clip member 316 so as to place the clip member 316 in the disconnecting position when inserting the mating male coupling device 400. In some examples, it is not necessary to manually force down on the clip member 316 when inserting the mating male coupling device 400 as the mating male coupling device 400 upon engagement with an inner lip 348 (see FIG. 15) of the plate portion 326 will force the clip member 316 down into the disconnecting position. The plate portion 326 defines an aperture 350 (see FIG. 18) sufficiently large to allow the mating male coupling device 400 to extend partially therethrough and is generally alignable with the fluid passageway 322 of the female coupling device 300. The plate portion 326 slides in a slot 352 extending transversely of the female coupling device 300.

In one example, side surfaces of the female coupling device 300 can include a shoulder portion and the plate portion 326 of the clip member 316 can include barbed projections along its side edge. The barbed projections can have a substantially flat portion for engaging the shoulder portion of the female coupling device 300 so as to prevent the clip member 316 from being inadvertently removed from the female coupling device 300 after it has been inserted. This assures that the clip member 316 will remain with the female coupling device 300 at all times in typical use.

Referring now to FIGS. 19-22, the male coupling device 400 is shown.

The male coupling device 400 includes a main body 410 having a front face 412. The front face 412 defines an opening 414 leading into a fluid passageway 422 (see FIG. 22).

The male coupling device 400 also includes a termination 418 coupled to the main body 410 using known techniques, such as sonic welding or staking. The termination 418 is configured to be coupled to another component, such as a fluid line.

The example male coupling device 400 includes a valve member 430 and spring 424 positioned within the fluid passageway 422. The spring 424 biases the valve member 430 into the closed position shown in FIG. 22. A front surface 432 of the valve member 430 is exposed at the front face 412 of the main body 410. In this position, a shoulder 482 on the valve member 430 engages a surface 484 formed by the main body 410 to limit further travel of the valve member 430 in a direction toward the front face 412.

In this position, a first seal 442 (e.g., major seal) provides a seal between the main body 410 and the valve member 430. The seal limits movement of fluid through the fluid passageway 422.

Figure 23:
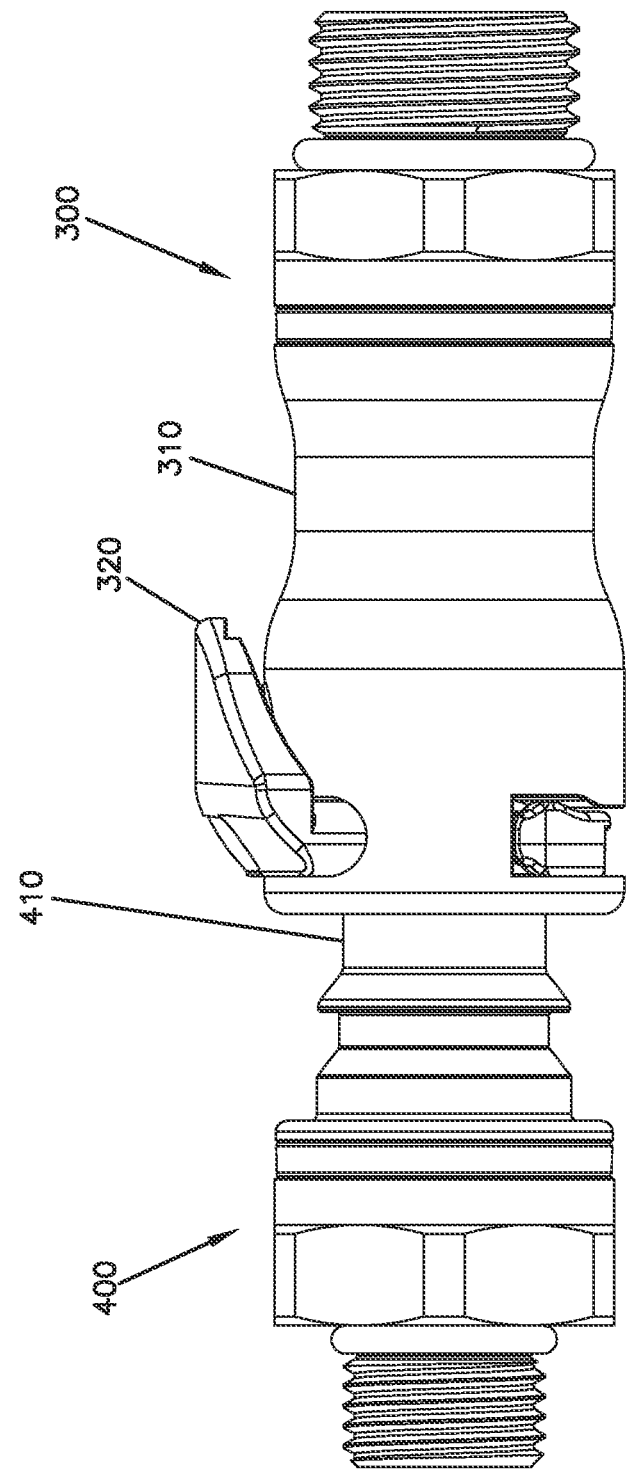
FIG. 23 is a side view of a coupling assembly including the female and male coupling devices shown in FIGS. 15 and 19 in a pre-coupled position.
Figure 24:
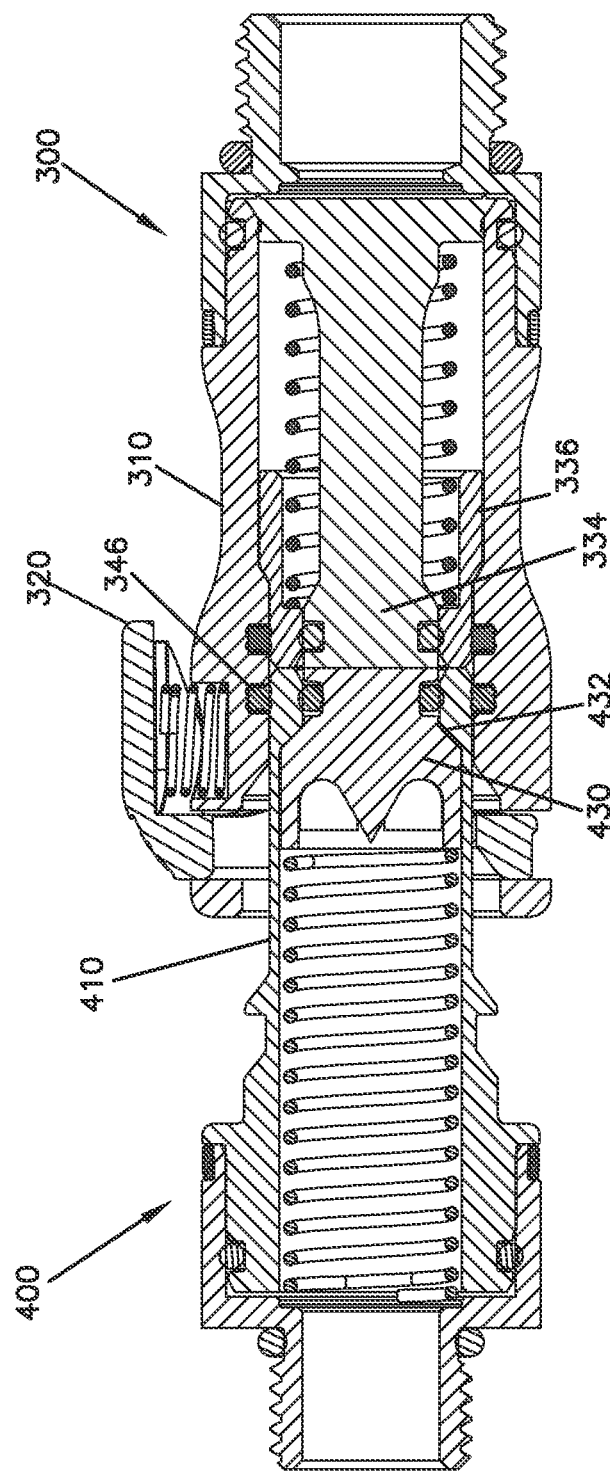
FIG. 24 is a cross-sectional view of the female and male coupling devices of FIG. 23.

Referring now to FIGS. 23-24, the female coupling device 300 and the male coupling device 400 are shown in a pre-coupled position. In this position, the main body 410 of the male coupling device 400 is partially inserted into the opening 314 of the main body 310 of the female coupling device 300.

In this position, the front surface 432 of the valve member 430 engages the stem head 334. In addition, the front face 432 engages the sleeve 336. Further, the third seal 346 seals against the main body 410 of the male coupling device 400 so that a fluid-tight configuration is created.

Figure 25:
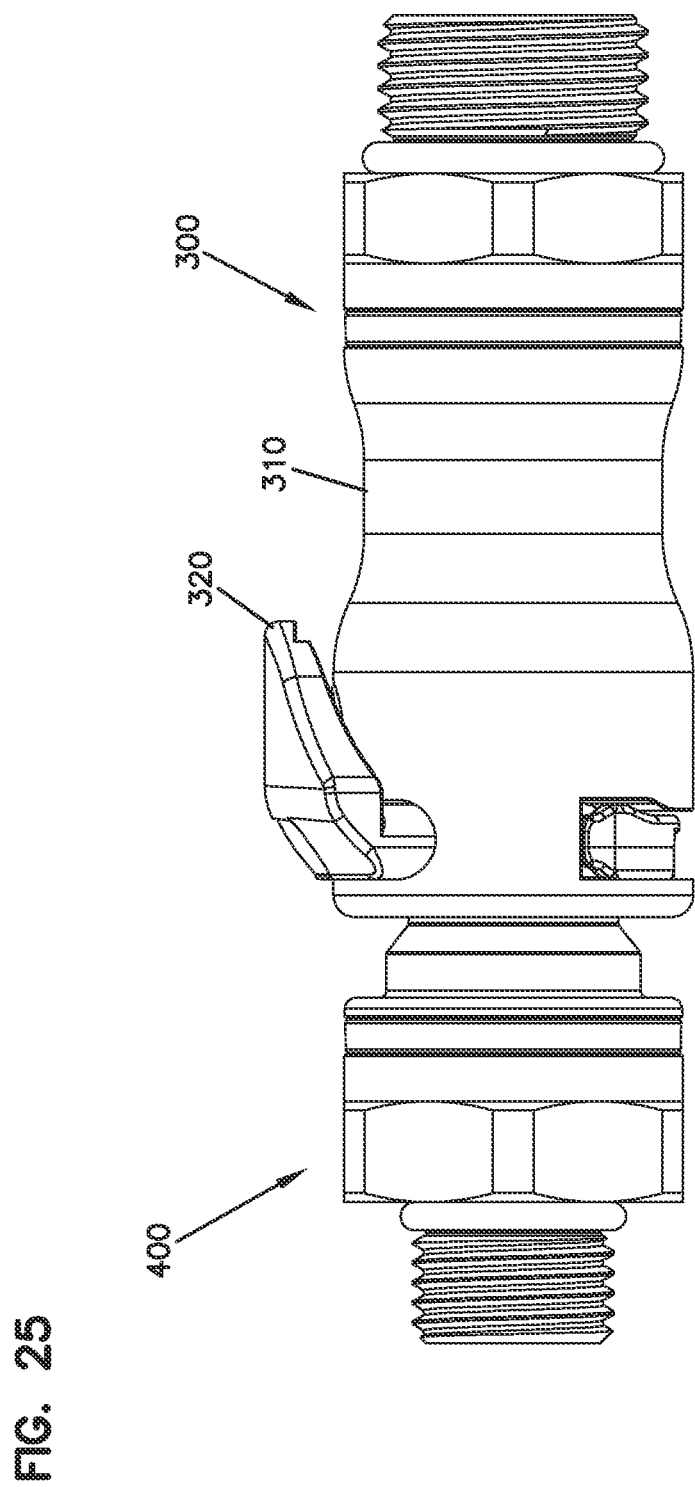
FIG. 25 is a side view of the female and male coupling devices shown in FIGS. 15 and 19 in a partially-coupled position.
Figure 26:
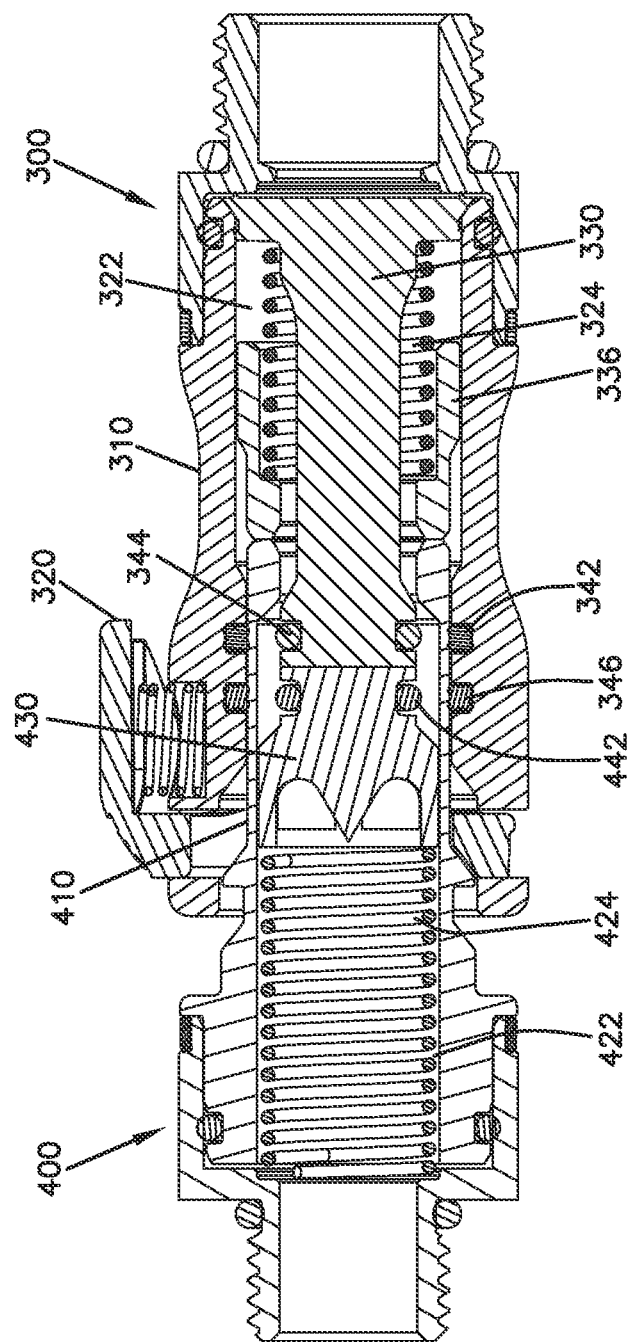
FIG. 26 is a cross-sectional view of the female and male coupling devices of FIG. 25.

Referring now to FIGS. 25-26, the female coupling device 300 and the male coupling device 400 are shown in a partially-coupled position. In this position, the main body 410 of the male coupling device 400 is more-completely inserted into the opening 314 of the main body 310 of the female coupling device 300.

As this occurs, the main body 410 of the male coupling device 400 is positioned in the fluid passageway 322 so that both seals 342, 346 engage the main body 410. Further, both the sleeve 336 and the valve member 430 are displaced against the springs 324, 424, respectively. When this occurs, the seals 344, 442 are disengaged so that fluid can start to flow through the fluid passageways 322, 422.

Figure 27:
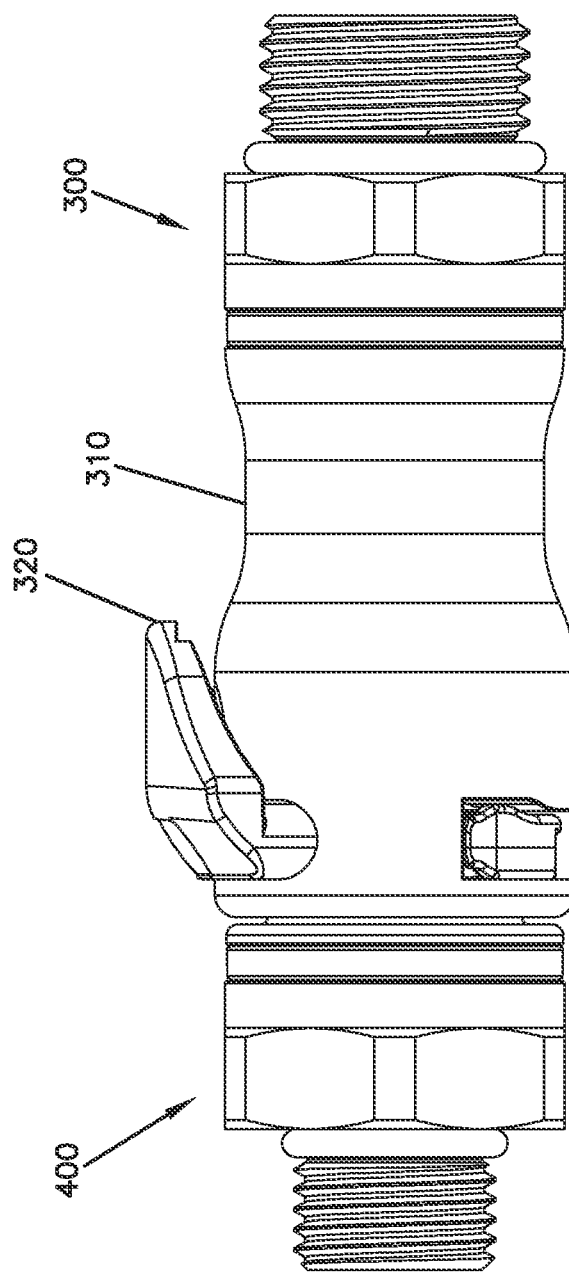
FIG. 27 is a side view of the female and male coupling devices shown in FIGS. 15 and 19 in a fully-coupled position.
Figure 28:
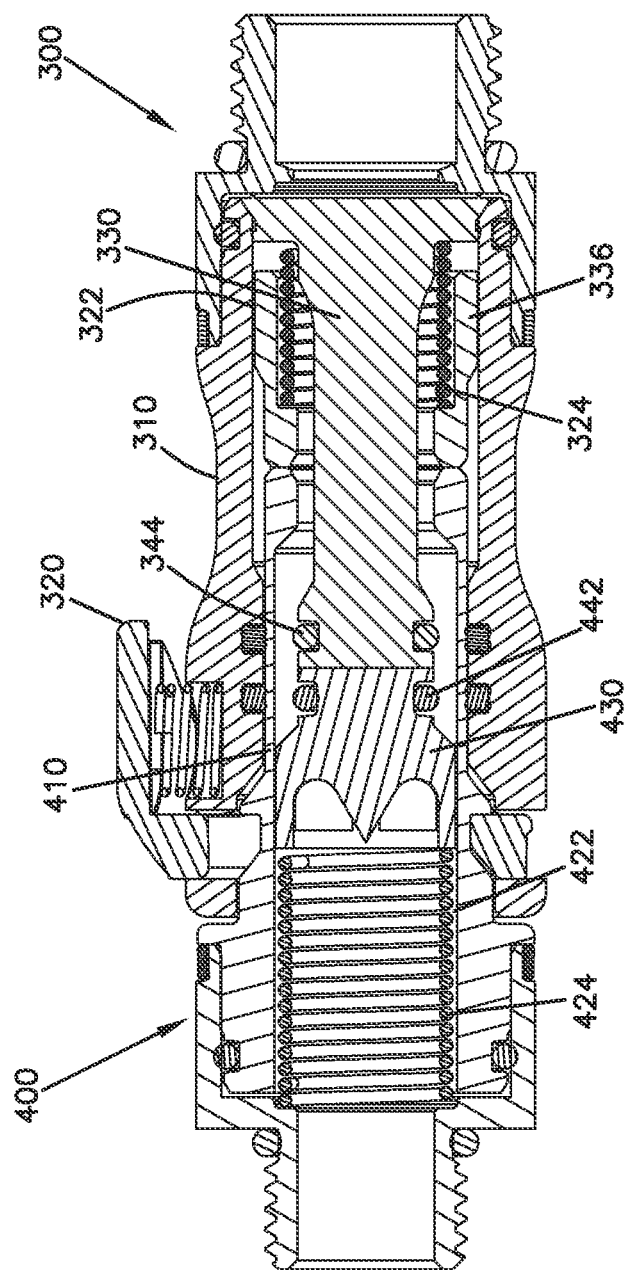
FIG. 28 is a cross-sectional view of the female and male coupling devices of FIG. 27.

Referring now to FIGS. 27-28, the female coupling device 300 and the male coupling device 400 are shown in a fully-coupled position. In this position, the main body 410 of the male coupling device 400 is completely inserted into the opening 314 of the main body 310 of the female coupling device 300.

Both of the springs 324, 424 are compressed, and the sleeve 336 and valve member 430 are further displaced. This assures that seals 344, 442 are fully disengaged so that fluid can pass through the fluid passageways 322, 422.

To release, the male coupling device 400 is pulled out of the female coupling device 300. When this occurs, the springs 324, 424 return the sleeve 336 and the valve member 430 to the resting positions shown in FIGS. 23-24.

In certain examples, the spring 328 (e.g., resilient biasing member) is disposed below the tab portion 320. Upon pressing down on the clip member 316, the spring 328 is displaced from its at rest position to a displaced position. The clip member 316 is then biased upwardly such that the plate portion 326 rests in a circumferential groove 434 of the male coupling device 400 when in the connecting position. In other words, the clip member 316 is biased upwardly such that when the circumferential groove 434 of the male coupling device 400 is aligned with the inner lip 348 of the plate portion 326 of the clip member 316, the spring 328 will force the clip member 316 upward into engagement with the circumferential groove 434 thereby placing the clip member 316 into the connecting position and retaining the male and female coupling devices 300, 400 in a coupled state upon the application of the fluid pressure.

In other examples, by merely inserting the male coupling device 400, the clip member 316 will be forced down into its disconnecting position thereby doing away with the need for the user to press down on the tab portion 320 of the clip member 316. To uncouple the coupling the user simply presses down on the clip member 16 and removes the male coupling device 400.

Additional details about an example latched coupling assembly are provided in U.S. Pat. No. 7,547,047 to deCler et al. and U.S. Pat. No. 5,104,158 to Meyer et al., the entirety of which are hereby incorporated by reference.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of using a low-spill coupling system, comprising:
    slidably advancing a male coupling device into a female coupling device having a quick disconnect lock comprising a slidable plate and pressable tab, wherein the male coupling device includes:
        a male insert body defining a front face with a front opening; an exterior circumferential surface of the male coupling device extending continuously rearward for a first axial length from the front face to an exterior circumferential shoulder that ramps outwardly from the exterior circumferential surface; an exterior circumferential groove positioned rearwardly of the exterior circumferential shoulder and configured to mate with the slidable plate of the quick disconnect lock, both the exterior circumferential shoulder and the exterior circumferential groove being no less in diameter than the exterior circumferential surface, wherein the exterior circumferential groove is at least partially defined by a rear-facing radial surface, a circumferential groove surface extending rearwardly from the rear-facing radial surface, and a rear shoulder surface extending rearwardly and outwardly from the circumferential groove surface; and an interior fluid passageway which has a first bore diameter extending continuously rearward from the front face to an interior shoulder transitioning to a larger second bore diameter that extends continuously rearward for a majority of an overall axial length of the male coupling device;
        a rear terminal that defines a maximum lateral width of the male coupling device at a position rearward of the exterior circumferential groove and that has an exterior connection end portion extending between the maximum lateral width and a rearmost end of the male coupling device, wherein the exterior circumferential groove for mating with the slidable plate of the quick disconnect lock is positioned axially closer to the exterior connection end portion of the rear terminal than to the front face of the male insert body, and wherein the rear terminal defines a rear terminal central bore at the rearmost end of the male coupling device axially aligned with the interior fluid passageway defined by the male insert body; and
        a valve that is longitudinally slidable within the male insert body and configured to abut the interior shoulder, the valve having a valve seal mounted thereto and having a frontmost valve face with a diameter greater than half a diameter of the exterior circumferential surface of the male insert body, wherein the valve is spring biased toward the front face so that the frontmost valve face is parallel with the front face of the male insert body and the valve seal releasably engages with the first bore diameter of the male insert body, and wherein valve has a maximum axial length that is less than the first axial length extending from the front face to the exterior circumferential shoulder; and
    releasably mating the slidable plate of the quick disconnect lock of the female coupling device with the exterior circumferential groove of the male coupling device.

2. The method of claim 1, wherein the female coupling device includes:
    a female main body including a female opening at a front-most face of the female coupling device that is configured to receive the front face and exterior circumferential surface of the male coupling device, and an interior bore configured for fluid communication with the interior fluid passageway of the male coupling device;
    at least a first bore seal seated in a first groove along the interior bore;
    a stem that includes a stem head carrying a stem seal and defining a stem front face that is oriented toward the front-most face of the female coupling device; and
    a movable sleeve slidable within the interior bore relative to the stem head so that the stem seal is releasably engageable with an interior circumferential sleeve surface of the sleeve, wherein the movable sleeve is slidable in a longitudinally rearward direction to simultaneously disengage from the stem seal and the first bore seal in response to movement of the male coupling device from a pre-coupled position toward a partially-coupled position, wherein the stem seal is spaced apart from the movable sleeve and the male coupling device in response to the female coupling device releasably receiving the male coupling device in a fully-coupled position.

3. The method of claim 2, wherein both the slidable plate and the pressable tab of the quick disconnect lock of the female coupling device are movable relative to the female main body to releasably lock the male coupling device in the fully-coupled position.

4. The method of claim 1, wherein the slidable plate of the quick disconnect lock is spring biased in a lateral direction toward the exterior circumferential groove of the male coupling device.

5. The method of claim 4, wherein the slidable plate and the pressable tab of the quick disconnect lock are interconnected.

6. The method of claim 5, wherein the slidable plate and the pressable tab of the quick disconnect lock extend perpendicularly to one another.

7. The method of claim 4, wherein the pressable tab is manually adjustable by a user to release the quick disconnect lock the exterior circumferential groove of the male coupling device.

8. The method of claim 1, wherein the quick disconnect lock of the female coupling device releasably mates with the exterior circumferential groove of the male coupling device while the rear terminal of the male coupling device remains external to the female coupling device.

9. The method of claim 1, wherein the exterior circumferential surface defined by the male insert body of the male coupling device slidably engages an interior bore of the female coupling device, and the valve seal of the male coupling device is positioned radially inward of the exterior circumferential surface defined by the male insert body of the male coupling device.

10. The method of claim 9, wherein the valve seal is the forward-most seal of the male coupling device closest to the front face of the male coupling device.

11. The method of claim 9, wherein the valve seal is located forward of the exterior circumferential shoulder of the male insert body while all other seals of the male coupling device are located rearward of the exterior circumferential shoulder of the male insert body.

12. The method of claim 1, wherein the exterior connection end portion of the rear terminal of the male coupling device comprises connection ridges.

13. The method of claim 12, wherein the connection ridges of the rear terminal comprise an exterior thread extending toward the rearmost end of the male coupling device.

14. The method of claim 1, wherein the rear terminal of the male coupling device comprises an exterior hex structure.

15. The method of claim 14, wherein the exterior hex structure defines the maximum lateral width of the male coupling device.

16. The method of claim 1, wherein the male insert body is a one-piece main body of the male coupling device, and the rear terminal is mounted to the one-piece main body with a ring seal positioned radially outward of the one-piece main body.

17. The method of claim 16, wherein the male coupling device further comprises a coil spring engaged with the valve to bias the valve toward the front face of the male insert body, wherein the coil spring is positioned radially inward of the rear terminal of the male coupling device.

18. The method of claim 1, wherein the exterior circumferential shoulder of the male insert body is positioned closer to the front face of the male insert body than to the rearmost end of the male coupling device.

19. The method of claim 1, wherein the rear terminal is mounted to the male insert body.

20. A low-spill coupling system, comprising:

a female coupling device configured to releasably receive a male coupling device, wherein the female coupling device includes:

a female main body defining: a front opening at a front-most face of the female main body, first and second sidewall openings positioned rearwardly of said front opening such that both the first and second sidewall openings slidably receive a movable lock plate of a quick disconnect lock of the female coupling device, a first interior shoulder that is positioned rearwardly of the first and second sidewall openings and that tapers inwardly to a first interior bore having a first bore diameter, the first interior bore extending rearwardly from the first interior shoulder for a first bore axial length to a second interior shoulder that transitions to a second interior bore having a second bore axial length greater than the first bore axial length and a second bore diameter greater than the first bore diameter, wherein both the first and second sidewall openings are positioned axially closer to the front opening of the female main body than to the second larger interior bore of the female main body, and wherein an exterior of the female main body includes: a first outer diameter positioned rearwardly of the first and second sidewall openings, a central waist portion positioned rearwardly of the first outer diameter and including a second outer diameter smaller than the first outer diameter, and a third outer diameter positioned rearwardly of the central waist portion and being larger than the second circumferential diameter;

the quick disconnect lock comprising the movable lock plate slidable within the first and second sidewall openings of the female main body, an exterior push tab joined with and extending rearwardly away from the movable lock plate such that the exterior push tab is configured to actuate of the movable lock plate, and a lock spring engaged with the exterior push tab and seated within a blind exterior hole of the female main body at a location entirely rearward of the movable lock plate, wherein the lock spring biases the exterior push tab away from the female main body so as to urge the movable lock plate toward a lock position within the first and second sidewall openings of the female main body, the lock spring of the quick disconnect lock being oriented along an axis that extends perpendicular to the first interior bore and the second larger interior bore of the female main body;

a stem having a stem head that carries a stem seal positioned in the first interior bore and that is stationary relative to the front-most face of the female main body, wherein the stem head defines a stem front face that is oriented toward the front opening and that has a stem front diameter greater than half the first bore diameter, wherein the stem includes a rear end that is opposite from the stem head that defines a stem rear diameter greater than the second bore diameter of the second interior bore of the female main body;

a forward bore seal and a rear bore seal seated in respective grooves along the first interior bore such that both the forward and rear bore seals are located radially inward from the exterior push tab of the quick disconnect lock, the rear bore seal being positioned further from the front opening than the forward bore seal and located at a same axial distance from the front opening as the stem seal;

a movable sleeve slidable relative to the stem head so that the stem seal is releasably engageable with an interior circumferential sleeve surface of the sleeve, wherein the movable sleeve is biased toward a closed position in which the movable sleeve abuts with the second interior shoulder of the female main body and simultaneously engages with the rear bore seal and the stem seal, wherein the movable sleeve is configured to slide in a longitudinally rearward direction such that the stem seal disengages from both the movable sleeve and the male coupling device when the female coupling device releasably receives the male coupling device in a fully-coupled position; and a rear terminal connected to a rear portion of the female main body and defining a rear terminal bore diameter smaller than said the second bore diameter of the second interior bore of the female main body.

21. The system of claim 20, wherein the rear terminal is connected to the rear portion of the female main body, and a seal is mounted radially inward of an interior circumferential surface of the rear terminal and radially outward of the female main body, and the rear terminal includes: an exterior hex structure, an exterior thread positioned between the exterior hex structure and a rearmost end of the rear terminal, and an exterior rear seal positioned between the exterior thread and the exterior hex structure.

22. The system of claim 21, wherein the movable sleeve is biased toward the closed position by a sleeve spring arranged between the moveable sleeve and the rear end of the stem at a location entirely rearward of the forward seal, the rear bore seal, and the stem seal.

23. The system of claim 20, wherein the movable lock plate of the quick disconnect lock includes an aperture therethrough, the aperture having a greater aperture size at a forward face of the movable lock plate than at a rear face of the movable lock plate, wherein the movable lock plate and the exterior push tab of the quick disconnect lock are formed as a unitary structure in a generally L-shaped configuration.

24. The system of claim 20, further comprising the male coupling device.

25. The system of claim 24, wherein the male coupling device further comprises: a male main body having a male front end configured to slide within the first interior bore of the female coupling device and engage the movable sleeve of the female coupling device; a valve member that is longitudinally slidable within the male main body and that has a valve seal mounted thereto, wherein the valve member is biased toward the male front end to releasably engage the valve seal with the male main body and to align a valve front face of the valve member aligns with the male front end, wherein both the valve seal of the male coupling device and the stem seal of the female coupling device are disengaged from both the movable sleeve and the male coupling device when the female coupling device releasably receives the male coupling device in the fully-coupled position.

* * * * *